US011854501B1

(12) United States Patent
Ji et al.

(10) Patent No.: US 11,854,501 B1
(45) Date of Patent: Dec. 26, 2023

(54) BACKLIGHT DRIVING CIRCUT, BACKLIGHT MODULE AND DISPLAY DEVICE

(71) Applicants: MIANYANG HKC OPTOELECTRONICS TECHNOLOGY CO., LTD., Sichuan (CN); HKC CORPORATION LIMITED, Guangdong (CN)

(72) Inventors: Guofei Ji, Sichuan (CN); Dalei Zhang, Sichuan (CN); Haoxuan Zheng, Sichuan (CN)

(73) Assignees: MIANYANG HKC OPTOELECTRONICS TECHNOLOGY CO., LTD., Mianyang (CN); HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/332,024

(22) Filed: Jun. 9, 2023

Related U.S. Application Data

(63) Continuation of application No. PCT/CN2022/141294, filed on Dec. 23, 2022.

(30) Foreign Application Priority Data

Jul. 20, 2022 (CN) .......................... 202210854938.4

(51) Int. Cl.
  *G09G 3/34* (2006.01)
  *G09G 3/00* (2006.01)

(52) U.S. Cl.
  CPC ............. *G09G 3/342* (2013.01); *G09G 3/006* (2013.01); *G09G 2320/064* (2013.01); *G09G 2330/12* (2013.01)

(58) Field of Classification Search
  CPC ............................... G09G 3/3406; G09G 3/34
  See application file for complete search history.

(56) References Cited

U.S. PATENT DOCUMENTS

2009/0021470 A1* 1/2009 Lee .................... H05B 45/3725
                                                     345/102
2012/0256550 A1 10/2012 Akiyama
(Continued)

FOREIGN PATENT DOCUMENTS

CN          1458547 A    11/2003
CN          1591115 A    3/2005
(Continued)

OTHER PUBLICATIONS

WIPO, International Search Report and Written Opinion for International Application No. PCT/CN2022/141294, dated Feb. 22, 2023.
(Continued)

*Primary Examiner* — Sepehr Azari
(74) *Attorney, Agent, or Firm* — HAUPTMAN HAM, LLP

(57) ABSTRACT

The present disclosure provides a backlight driving circuit including a power supply module and a current adjustment module. The current adjustment module detects the brightness of the first light-emitting columns and/or the second light-emitting columns to obtain detection current, and compares the detection current with a mode switching current. The current adjustment module controls one first light-emitting column and one second light-emitting column to connect with one first wire simultaneously, or controls one first light-emitting column to connect with one second connecting wire and controls one second light-emitting column to connect with another second connecting wire.

19 Claims, 5 Drawing Sheets

(56) References Cited

U.S. PATENT DOCUMENTS

| | | | |
|---|---|---|---|
| 2013/0119873 A1 | 5/2013 | Fujita | |
| 2018/0324912 A1* | 11/2018 | Hsu | H05B 47/10 |
| 2019/0090321 A1* | 3/2019 | Lee | H05B 45/48 |

FOREIGN PATENT DOCUMENTS

| | | | |
|---|---|---|---|
| CN | 1801300 A | 7/2006 | |
| CN | 101329850 A | 12/2008 | |
| CN | 101902855 A | 12/2010 | |
| CN | 102238768 A | 11/2011 | |
| CN | 102640306 A | 8/2012 | |
| CN | 202551453 U | 11/2012 | |
| CN | 102971784 A | 3/2013 | |
| CN | 103165085 A | 6/2013 | |
| CN | 103198799 A | 7/2013 | |
| CN | 103280190 A | 9/2013 | |
| CN | 103857106 A | 6/2014 | |
| CN | 106535391 A | 3/2017 | |
| CN | 112233625 A | 1/2021 | |
| CN | 114141204 A | 3/2022 | |
| JP | 2009283775 A | 12/2009 | |
| TW | 201318469 A | 5/2013 | |
| TW | 201622483 A | 6/2016 | |

OTHER PUBLICATIONS

The first office action issued in corresponding CN application No. 202210854938.4 dated Feb. 17, 2023.

\* cited by examiner

```
┌─────────────────────────────────────────────────────────┐
│  a power supply module, a plurality of first light-emitting columns │
│     connected in parallel, and a plurality of second light-emitting │
│    columns connected in parallel are provided, the power supply     │
│   module is electrically connected with first ends of the first light- │
│      emitting columns and first ends of the second light-emitting    │       S410
│     columns, second ends of the plurality of the first light-emitting │
│      columns and second ends of the plurality of the second light-   │
│   emitting columns are electrically connected with the power supply  │
│   module selectively through a plurality of first connecting wires or a │
│              plurality of second connecting wires                    │
└─────────────────────────────────────────────────────────┘
                              │
                              ▼
┌─────────────────────────────────────────────────────────┐
│  a detection current is obtained based on the brightness of the first │       S420
│     light-emitting columns and/or the second light-emitting columns  │
└─────────────────────────────────────────────────────────┘
                              │
                              ▼
┌─────────────────────────────────────────────────────────┐
│   based on the magnitude of the detection current, the second end of │
│   one of the first light-emitting columns and the second end of one of │
│    the second light-emitting columns are electrically connected with │       S430
│    one of the first connecting wires simultaneously, or the second end │
│    of one of the first light-emitting columns and the second end of one │
│      of the second light-emitting columns are respectively electrically │
│                connected to one of the second connecting wires       │
└─────────────────────────────────────────────────────────┘
```

FIG. 7

BACKLIGHT DRIVING CIRCUT, BACKLIGHT MODULE AND DISPLAY DEVICE

CROSS-REFERENCE TO RELATED APPLICATIONS

This application is a continuation of International Application No. PCT/CN2022/141294, filed on Dec. 23, 2022, which claims priority under 35 U.S.C. § 119(a) to Chinese Patent Application No. 202210854938.4, entitled "backlight driving circuit and method thereof, backlight module and display device", filed Jul. 20, 2022, the entire disclosures of which are incorporated herein by reference.

TECHNICAL FIELD

This disclosure relates to the field of display technology, and in particular to a backlight driving circuit, a backlight module with the backlight driving circuit, and a display device with the backlight driving circuit.

BACKGROUND

Liquid Crystal Displays (LCDs) are more and more important in people's life and work, and they are widely used because of their advantages such as thin body, power saving and low price. LCDs usually include an LCD panel and a backlight module, the backlight module has multiple light bars and a backlight driving circuit to supply power to the light bars. The backlight module is required to provide backlight source with different brightness under different work states. The backlight source with different brightness is achieved by controlling the magnitude of current flowing through each light bar by the backlight driving circuit, therein the amount of brightness of each light bar is positively related to the amount of current flowing through the light bar.

The backlight driving circuit and the multiple light bars constitute a circuit loop, the conversion efficiency of the backlight driving circuit is related to the magnitude of current flowing back to the backlight driving circuit through the circuit loop. The conversion efficiency of the backlight driving circuit is at a high level when the current flowing back to the backlight driving circuit is within a preset current range; if the current flowing back to the backlight driving circuit is above the preset current range, the conversion efficiency of the backlight driving circuit decreases as the current flowing back to the backlight driving circuit increases, and if the current flowing back to the backlight driving circuit is below the preset current range, the conversion efficiency of the backlight driving circuit decreases as the current flowing back to the backlight driving circuit decreases.

However, in practical applications, the current flowing back to the backlight driving circuit is lower than the minimum value of this preset current range when the LCDs at a work state with a low brightness. At this time, the conversion efficiency of the backlight driving circuit is low, thus leading to low power utilization. Therefore, how to control the magnitude of the current in the circuit loop formed by the backlight driving circuit and the multiple light bars to improve the conversion efficiency of the backlight driving circuit under the premise of ensuring the brightness of the light bars remains unchanged, is an urgent problem to be solved by the technical person in the field.

SUMMARY

In view of the above-mentioned shortcomings of the prior art, the present disclosure aims to provide a backlight driving circuit, a backlight module with the backlight driving circuit, and a display device with the backlight module.

In order to solve the above technical problem, a backlight driving circuit is provided in implementations of the present disclosure, the backlight driving circuit includes a power supply module for providing power signals to a plurality of first light-emitting columns connected in parallel and a plurality of second light-emitting columns connected in parallel, the backlight driving circuit also includes a current adjustment module, a plurality of first connecting wires and a plurality of second connecting wires. The power supply module is electrically connected with first ends of the first light-emitting columns and first ends of the second light-emitting columns. The current adjustment module is electrically connected with second ends of the first light-emitting columns and second ends of the second light-emitting columns simultaneously. The current adjustment module is electrically connected to the power supply module selectively through the plurality of first connecting wires or the plurality of second connecting wires. The current adjustment module is used to detect brightness of the first light-emitting columns and/or brightness of the second light-emitting columns to obtain a detection current, and compare the detection current with a mode switching current. When the detection current is less than the mode switching current, the current adjustment module controls the second end of one of the first light-emitting columns and the second end of one of the second light-emitting columns electrically connect with one of the first connecting wires simultaneously. When the detection current is greater than or equal to the mode switching current, the current adjustment module controls the second end of one of the first light-emitting columns to connect with one of the second connecting wires, and controls the second end of one of the second light-emitting columns to electrically connect with one of the second connecting wires.

In conclusion, the backlight driving circuit provided in the implementations of the present disclosure includes the power supply module, the current adjustment module, the plurality of first connecting wires, and the plurality of second connecting wires. The current adjustment module is electrically connected to the power supply module selectively through the plurality of first connecting wires or the plurality of second connecting wires. The current adjustment module detects the brightness of the first light-emitting columns and/or the second light-emitting columns to obtain the detection current, and compare the detection current with the mode switching current. When the detection current is less than the mode switching current, the current adjustment module controls the second end of one of the first light-emitting columns and the second end of one of the second light-emitting columns simultaneously electrically connect with one of the first connecting wires. When the detection current is greater than or equal to the mode switching current, the current adjustment module controls the second end of one of the first light-emitting columns to connect with one of the second connecting wires, and controls the second end of one of the second light-emitting columns to electrically connect with one of the second connecting wires. Therefore, on the premise that the brightness of the first light-emitting columns or the second light-emitting columns are maintained to be unchanged, by changing a connection mode of the second end of the first light-emitting columns and the second end of the second light-emitting columns, the current flowing back to the power supply module is caused to be within the preset current range. Thus, the conversion efficiency of the power supply module is improved, low power consumption is realized and the power utilization rate is improved.

Based on the same conception, the implementations of the present disclosure also provide a backlight module, the backlight module includes a back plate, the back plate comprises a first fixing plate, a second fixing plate and a connecting plate, the first fixing plate and the second fixing plate are arranged relative to each other, the connecting plate is fixedly connected between the first fixing plate and the second fixing plate. The backlight module also includes a plurality of first light-emitting columns, a plurality of second light-emitting columns, a first circuit board, a second circuit board and the foregoing backlight driving circuit. The first circuit board is arranged on one side, of the first fixed board surface, facing the second fixed board, the second circuit board is arranged on one side, of the second fixed board surface, facing the first fixed board. The first light-emitting columns and the second light-emitting columns are arranged between the first circuit board and the second circuit board. The backlight driving circuit includes a power supply module and a current adjustment module. The power supply module is arranged on the first circuit board, and the current adjustment module is arranged on the second circuit board.

In conclusion, the backlight module provided in the implementations of the present disclosure implementation includes the plurality of first light-emitting columns, the plurality of second light-emitting columns and the backlight driving circuit. The backlight driving circuit includes the power supply module, the current adjustment module, the plurality of first connecting wires, and the plurality of second connecting wires. The current adjustment module is electrically connected to the power supply module selectively through the plurality of first connecting wires or the plurality of second connecting wires. The current adjustment module detects the brightness of the first light-emitting columns and/or the second light-emitting columns to obtain the detection current, and compare the detection current with the mode switching current. When the detection current is less than the mode switching current, the current adjustment module controls the second end of one of the first light-emitting columns and the second end of one of the second light-emitting columns simultaneously electrically connect with one of the first connecting wires. When the detection current is greater than or equal to the mode switching current, the current adjustment module controls the second end of one of the first light-emitting columns to connect with one of the second connecting wires, and controls the second end of one of the second light-emitting columns to electrically connect with one of the second connecting wires. Therefore, on the premise that the brightness of the first light-emitting columns or the second light-emitting columns are maintained to be unchanged, by changing a connection mode of the second end of the first light-emitting columns and the second end of the second light-emitting columns, the current flowing back to the power supply module is caused to be within the preset current range. Thus, the conversion efficiency of the power supply module is improved, low power consumption is realized and the power utilization rate is improved.

Based on the same conception, the implementations of the present disclosure also provide a display device, the display device comprises a display panel and the foregoing backlight module. The display panel is located on the light outlet side of the backlight module. The display panel displays images under the backlight provided by the backlight module.

In conclusion, the display device provided in the implementations of the present disclosure includes the display panel and the backlight module, the backlight module includes the plurality of first light-emitting columns, the plurality of second light-emitting columns and the backlight driving circuit. The backlight driving circuit includes the power supply module, the current adjustment module, the plurality of first connecting wires, and the plurality of second connecting wires. The current adjustment module is electrically connected to the power supply module selectively through the plurality of first connecting wires or the plurality of second connecting wires. The current adjustment module detects the brightness of the first light-emitting columns and/or the second light-emitting columns to obtain the detection current, and compare the detection current with the mode switching current. When the detection current is less than the mode switching current, the current adjustment module controls the second end of one of the first light-emitting columns and the second end of one of the second light-emitting columns simultaneously electrically connect with one of the first connecting wires. When the detection current is greater than or equal to the mode switching current, the current adjustment module controls the second end of one of the first light-emitting columns to connect with one of the second connecting wires, and controls the second end of one of the second light-emitting columns to electrically connect with one of the second connecting wires. Therefore, on the premise that the brightness of the first light-emitting columns or the second light-emitting columns are maintained to be unchanged, by changing a connection mode of the second end of the first light-emitting columns and the second end of the second light-emitting columns, the current flowing back to the power supply module is caused to be within the preset current range. Thus, the conversion efficiency of the power supply module is improved, low power consumption is realized and the power utilization rate is improved.

Based on the same conception, the implementations of the present disclosure also provide a backlight driving method, the backlight driving method includes:

A power supply module, a plurality of first light-emitting columns connected in parallel, and a plurality of second light-emitting columns connected in parallel are provided, the power supply module is electrically connected with first ends of the first light-emitting columns and first ends of the second light-emitting columns, the second ends of the plurality of the first light-emitting columns and the second ends of the plurality of the second light-emitting columns are electrically connected with the power supply module selectively through the plurality of first connecting wires or the plurality of second connecting wires;

The detection current is obtained based on the brightness of the plurality of first light-emitting columns and/or the plurality of the second light-emitting columns;

The second end of one of the first light-emitting columns and the second end of one of the second light-emitting columns are simultaneously electrically connected with one of the first connecting wires, or the second end of one of the first light-emitting columns is electrically connected to one of the second connecting wires and the second end of one of the second light-emitting columns is electrically connected to another of the second connecting wires respectively.

In conclusion, the implementations of the present disclosure also provide a backlight driving method, and the backlight driving method includes: the power supply module, the plurality of first light-emitting columns connected in parallel, and the plurality of second light-emitting columns connected in parallel are provided, the power supply module is electrically connected with the first ends of the first light-emitting columns and the first ends of the second light-emitting columns, the second ends of the plurality of the first light-emitting columns and the second ends of the plurality of the second light-emitting columns are electrically connected with the power supply module selectively through the plurality of first connecting wires or the plurality of second connecting wires; the detection current is obtained based on the brightness of the plurality of first light-emitting columns and/or the plurality of the second light-emitting columns; the second end of one of the first light-emitting columns and the second end of one of the second light-emitting columns are simultaneously electrically connected with one of the first connecting wires, or the second end of one of the first light-emitting columns is electrically connected to one of the second connecting wires and the second end of one of the second light-emitting columns is electrically connected to another of the second connecting wires respectively. Therefore, on the premise that the brightness of the first light-emitting columns or the second light-emitting columns are maintained to be unchanged, by changing a connection mode of the second end of the first light-emitting columns and the second end of the second light-emitting columns, the current flowing back to the power supply module is caused to be within the preset current range. Thus, the conversion efficiency of the power supply module is improved, low power consumption is realized and the power utilization rate is improved

BRIEF DESCRIPTION OF THE DRAWINGS

In order to illustrate technical solutions of implementations of the present disclosure more clearly, the following is a brief description of the accompanying drawings to be used in the implementations. Obviously, the accompanying drawings in the following description are only some of the implementations of the present disclosure. For a person of ordinary skill in the art, with reference to these drawings, other accompanying drawings can be obtained without any creative work.

FIG. 7 is a flow diagram of a backlight driving method disclosed in a fourth implementation of the present disclosure.

DETAILED DESCRIPTION

Figure 1:
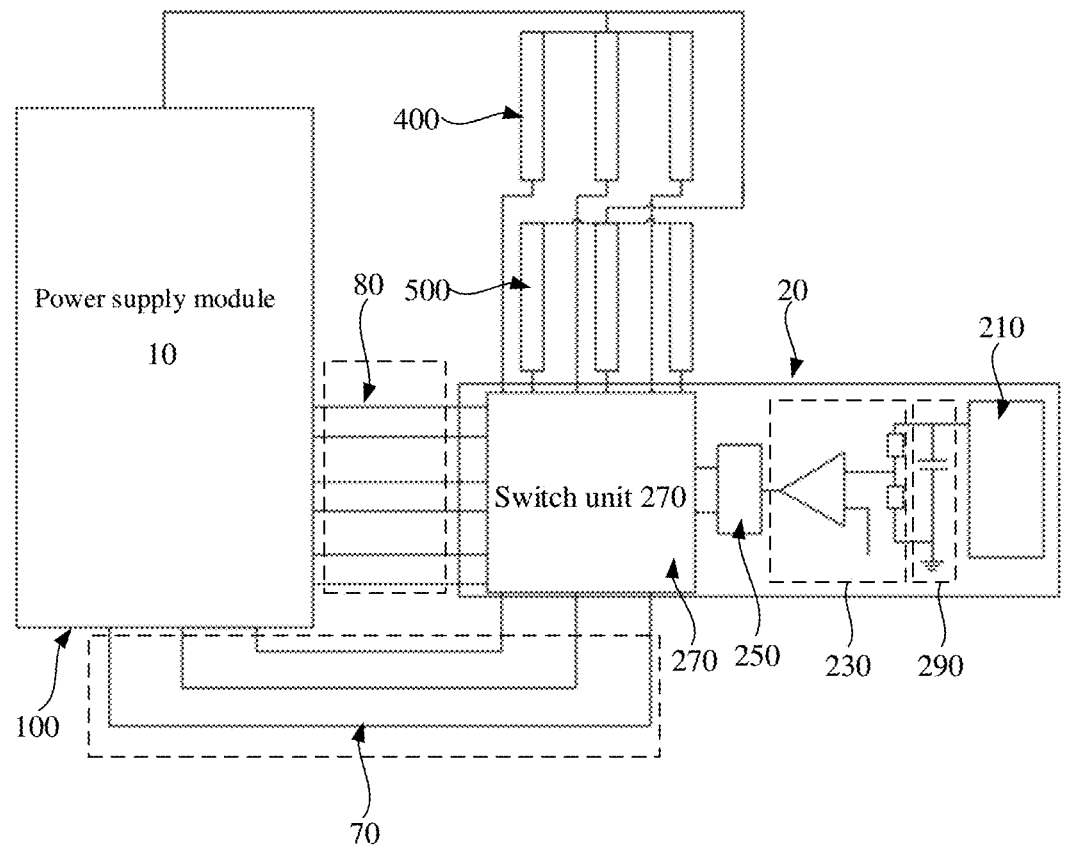
FIG. 1 is a schematic diagram of a backlight driving circuit disclosed in a first implementation of the present disclosure.

In order to facilitate understanding of the present disclosure, a comprehensive description will be given below with reference to relevant accompanying drawings. The accompanying drawings illustrate some exemplary implementations of the present disclosure. However, the present disclosure can be implemented in many different forms and is not limited to implementations described herein. On the contrary, these implementations are provided for a more thorough and comprehensive understanding of the present disclosure.

The following implementations are described with reference to additional drawings to illustrate particular implementations in which the present disclosure may be implemented. The serial numbers assigned herein for the components themselves, such as "first", "second", etc., are only used to distinguish between objects described and do not have any sequential or technical meaning. The "connection"/"connecting" and "coupling" in present disclosure, unless otherwise specified, include direct and indirect connection (coupling). Direction terms mentioned in present disclosure, such as "up", "down", "front", "back", "left", "right", "inside", "outside", "side", etc., are only directions with reference to the directions of the accompanying drawings. Therefore, the direction terms are used for better and clearer illustration and understanding of the present disclosure, and are not intended to indicate or imply that the device or component must have a specific orientation, be constructed and operated in the particular orientation, and therefore cannot be construed as limiting to the present disclosure.

In the description of the present disclosure, it should be noted that unless otherwise expressly specified or defined, terms such as "mounting", "installing", "coupling", "connecting" should be understood broadly. For example, coupling may be a fixed coupling, or a detachable coupling, or an integrated coupling; may be a mechanical coupling; and may be a direct coupling, an indirect coupling through a medium, or a communication coupling between two components. The specific meanings of the above-mentioned terms in the present disclosure could be understood by those of ordinary skill in the art according to specific situations. It should be noted that the terms "first", "second", etc. in the description, claims and accompanying drawings of the present disclosure are used to distinguish different objects, rather than to describe a specific order. In addition, the terms "includes," "may include," "contains" or "may contain" used in present disclosure indicate the existence of corresponding disclosed functions, operations, components, etc., and do not restrict one or more other functions, operations, components, etc. In addition, the term "includes" or "contains" indicates the existence of the corresponding features, numbers, steps, operations, elements, parts, or combinations thereof as disclosed in the specification, and does not exclude the existence or addition of one or more other features, numbers, steps, operations, elements, parts, or combinations thereof, which is intended to cover non-exclusive inclusion. It is also needed to understand that "at least one" as described in present disclosure means one or more, such as one, two or three, and "a plurality of" means at least two, such as two or three, unless otherwise explicitly specified.

Unless there are other definitions, all technical and scientific terms used herein have the same meaning as those commonly understood by technical persons belonging to technical field of the present disclosure. The terms used in the specification of the present disclosure herein are only for the purpose of describing specific implementations and are not intended to restrict present disclosure Please refer to FIG. 1, FIG. 1 is a schematic diagram of the structure of the backlight driving circuit disclosed in the first implementation of the present disclosure. The backlight driving circuit 100 provided in the implementations of the present disclosure may at least include a power supply module 10, a current adjustment module 20, a plurality of first connecting wires a plurality of second connecting wires 80. The power supply module 10 is electrically connected with first ends of a plurality of first light-emitting columns 400 connected in parallel and first ends of a plurality of second light-emitting columns 500 connected in parallel. The current adjustment module 20 is electrically connected with second ends of the plurality of first light-emitting columns 400 and second ends of the plurality of second light-emitting columns 500, the current adjustment module 20 20 is also electrically connected to the power supply module by selectively through the plurality of first connecting wires 70 or the plurality of second connecting wires 80.

In detail, the power supply module 10 is used to simultaneously provide power signals to the plurality of first light-emitting columns 400s and the plurality of second light-emitting columns 500, to cause the plurality of first light-emitting columns 400 and the plurality of second light-emitting columns 500 to emit light. The current adjustment module 20 is used to detect the brightness of the first light-emitting columns 400 and/or the second light-emitting columns 500 to obtain a corresponding detection current, and compare the detection current with a mode switching current. The current flowing through the first light-emitting columns 400 is equal to the current flowing through the second light-emitting columns 500. The number of the second connecting wires 80 is twice the number of the first connecting wires 70.

When the detection current is less than the mode switching current, the current adjustment module 20 controls a first light-emitting columns 400 to connect in parallel with a corresponding second light-emitting columns 500 to form a light-emitting column group, thus the plurality of light-emitting columns 400 and the plurality of second light-emitting columns 500 form a plurality of light-emitting column groups. And the current adjustment module 20 controls one light-emitting column group including one first light-emitting column 400 and one second light-emitting column 500 and the power supply module 10 to form a circuit loop through one corresponding first connecting wire 70, such that the current flowing through the first connecting wire 70 is a sum of the current passing through the first light-emitting column 400 and the second light-emitting column 500 in the same light-emitting column group.

When the detection current is greater than or equal to the mode switching current, the current adjustment module 20 controls a second end of one first light-emitting column 400 to electrically connect with a corresponding second connecting wire 80 and controls a second end of one second light-emitting column 500 to electrically connect with another corresponding second connecting wire 80, such that the current passing through the second connecting wire 80 is equal to the current passing through the first light-emitting column 400 and is equal to the current passing through the second light-emitting column 500.

In the implementations of present disclosure, the brightness of the first light-emitting columns 400 or the second light-emitting columns 500 is proportional to the magnitude of the current flowing through the first light-emitting columns 400 or the second light-emitting columns 500, namely, the current flowing through the first light-emitting columns 400 or the second light-emitting columns 500 is more greater, the brightness of the first light-emitting columns 400 or the second light-emitting columns 500 is more greater. The magnitude of the detection current is proportional to the magnitude of the current passing through the first light-emitting columns 400 or the magnitude of the current passing through the second light-emitting columns 500, that is, the current passing through the first light-emitting columns 400 or the second light-emitting columns 500 is more greater, the detection current is more greater.

In the implementations of the present disclosure, the first ends may be anodes of the first light-emitting columns 400 and the second light-emitting columns 500, the second ends may be cathodes of the first light-emitting columns 400 and the second light-emitting columns 500.

Understandably, the current adjustment module 20 obtains the detection current according to the brightness of the first light-emitting columns 400 and/or the second light-emitting columns 500, and compares the detection current with the mode switching current to obtain a comparison result, and based on the comparison result, electrically connects the second end of one of the first light-emitting columns 400 and the second end of one of the second light-emitting columns 500 with a first wires 70 simultaneously (namely, one first light-emitting column 400 and one second light-emitting column 500 are connected in parallel, and then are connected with a first connecting wire 70), or electrically connects the second end of the first light-emitting columns 400 with a second connecting wire 80 and connects the second end of the second light-emitting column 500 with a second connecting wire 80. Such that, the current flowing back to the power supply module 10 through each circuit loop is changed to cause the current flowing back to the power supply module 10 through each circuit loop is within a preset current range.

In the exemplary implementation, the power supply module 10 has a good conversion efficiency when the current flowing back to the power supply module 10 through each circuit loop is within the preset current range. When the current flowing back to the power supply module 10 through each circuit loop is outside of the preset current range, the conversion efficiency of the power supply module 10 is low.

In the implementations of the present disclosure, by changing the connection mode of the second ends of the first light-emitting columns 400 and the second ends of the second light-emitting columns 500 as described above, the current flowing through the first light-emitting columns 400 and the second light-emitting columns 500 are not changed, namely, the brightness of the first light-emitting columns 400 and the second light-emitting columns 500 are also not changed.

In the exemplary implementation, when the ratio of the magnitude of the detection current to the magnitude of the current flowing through one first light-emitting column 400 is 1, namely, when the detection current is equal to the current flowing through the first light-emitting column 400, the mode switching current may be within the preset current range. In other implementations, the mode switching current may be a minimum value of the preset current range. In present disclosure, the current to be compared detail is the magnitude of the current, and in many situations, the magnitude of the current is simplified as the current.

In the implementations of the present disclosure, the power supply module 10 may be a boost circuit, the power supply module 10 can boost a voltage input from a DC power supply input to a required voltage for powering on the first light-emitting columns 400 and the second light-emitting columns 500. At the same time, in order to achieve the controlling and modulation for the brightness of the first light-emitting columns 400 and the second light-emitting columns, the power supply module 10 further needs to receive a backlight enable signal and a brightness modulation signal from a timing controller (TCON) board or a system on chip (SOC) board.

In the exemplary implementation, the number of the first light-emitting columns 400 may range from 2 to 10, for example, 2, 4, 7, 10, or any other number, the present disclosure does not make specific restrictions on this. The number of the second light-emitting columns 500 may range from 2 to 10, for example, 2, 4, 7, 10, or any other number, and the present disclosure also does not make specific restrictions on this. The number of the first light-emitting columns 400 is equal to the number of the second light-emitting columns 500.

In the present disclosure embodiment, the number of the first light-emitting columns 400 and the second light-emitting columns 500 are both illustrated as 3 as example. Accordingly, the number of the first connecting wires 70 is 3, and the number of the second connecting wires is 6.

In one exemplary implementation, the number of LEDs (light-emitting diodes) included in the first light-emitting columns 400 may range from 2 to 10, for example, 2, 3, 6, 10, or other number, the present disclosure does not make specific restrictions on this. The number of LEDs included in the second light-emitting columns 500 may also range from 2 to 10, for example, 2, 3, 6, 10, or any other number, the present disclosure also does not make specific restrictions on this.

In the exemplary implementation, each first light-emitting column 400 and each of the second light-emitting column 500 may include a plurality of light-emitting diodes, and the number of LEDs of each first light-emitting column 400 is equal to the number of LEDs of each second light-emitting columns 500, thus to cause the resistance of the first light-emitting column 400 to be equal to the resistance of the second light-emitting column 500, thus to cause the current flowing through the first light-emitting column 400 to be equal to the current flowing through the second light-emitting column 500.

In the exemplary implementation, the power supply module 10 and the current adjustment module 20 both may be corresponding functional integration chips.

In other implementations, the second end of at least one first light-emitting column 400 and the second end of at least one second light-emitting column 500 may be simultaneously electrically connected with the first connecting wire 70, so that the current flowing back to the power supply module 10 is within the preset current range. The at least one can be one, two, three . . . etc., the present disclosure does not make specific restrictions on this.

In conclusion, the backlight driving circuit 100 provided in the implementations of the present disclosure includes the power supply module 10, the current adjustment module 20, the plurality of first connecting wires 70, and the plurality of second connecting wires 80. The power supply module 10 drives the plurality of first light-emitting columns 400 and the plurality of second light-emitting columns 500 to emit light. The current adjustment module 20 detects the brightness of the first light-emitting columns 400 and/or the second light-emitting columns 500 to obtain the detection current, and compare the detection current with the mode switching current. When the detection current is less than the mode switching current, the current adjustment module 20 controls the second end of at least one first light-emitting column 400 and the second end of at least one second light-emitting column 500 simultaneously electrically connect with one of the first connecting wires 70, thus to form a circuit loop and cause the current flowing through the first connecting wire 70 is equal to a sum of the current following through the at least one first light-emitting column 400 and the current following through the at least one second light-emitting column 500. When the detection current is greater than or equal to the mode switching current, the current adjustment module 20 controls the second end of one of the first light-emitting columns 400 to connect with one of the second connecting wires 80, and controls the second end of one of the second light-emitting columns 500 to electrically connect with one of the second connecting wires 80, so that the current flowing through the second connecting wire 80 is equal to the current flowing through the first light-emitting column 400 and is equal to the current flowing through the second light-emitting columns 500. Therefore, on the premise that the brightness of the first light-emitting columns 400 or the second light-emitting columns 500 are maintained to be unchanged, by changing a connection mode of the second ends of the first light-emitting columns 400 and the second ends of the second light-emitting columns 500, the current flowing back to the power supply module 10 is caused to be within the preset current range. Thus, the conversion efficiency of the power supply module 10 is improved, low power consumption is realized and the power utilization rate is improved.

Please refer to FIG. 1 again, in the implementation of the present disclosure, the current adjustment module 20 may include at least a brightness detection unit 210, a comparison unit 230, a switch control unit 250, and a switch unit 270. An output port of the brightness detection unit 210 is electrically connected to the comparison unit 230, the comparison unit 230 is electrically connected to the switch control unit 250, the switch control unit 250 is further electrically connected to the switch unit 270.

In detail, the brightness detection unit 210 is used to detect the brightness of the first light-emitting columns 400 and/or the second light-emitting columns 500, and generate the detection current based on the brightness detected, the detection current is output from the output port of the brightness detection unit 210 to the comparison unit 230.

The comparison unit 230 is used to sample the detection current at the output port of the brightness detection unit 210 to obtain a sampling current and compare the sampling current with a preset reference current. The sampling current corresponds to the detection current, and the preset reference current corresponds to the mode switching current.

When the sampling current is less than the preset reference current, the comparison unit 230 is used to output a first feedback signal to the switch control unit 250, and the switch control unit 250 controls the switch unit 270 to electrically connect the second end of one of the first light-emitting columns 400 and the second end of one of the second light-emitting columns 500 with one of the first connecting wires 70 simultaneously according to the first feedback signal, and form a circuit loop with the power supply module 10 through the first connecting wire 70. That is, based on the first feedback signal, the switch control unit 250 controls said switch unit 270 to electrically connect one first light-emitting column 400 and one second light-emitting column 500 in parallel, and connects the first light-emitting column 400 and the second light-emitting column 500 connected in parallel with the first connecting wire 70, and form a circuit loop with the power supply module 10 through the first connecting wire 70.

When the sampling current is greater than or equal to the preset reference current, the comparison unit 230 is used to output a second feedback signal to the switch control unit 250, and the switch control unit 250 controls the switch unit 270 to electrically connect the second end of one first light-emitting column 400 with one second connecting wire 80, and to electrically connect the second end of one second light-emitting column 500 with one second connecting wire 80, according to the second feedback signal.

In the implementation of the present disclosure, the brightness detection unit 210 may be a light sensor, the brightness detection unit 210 may include at least one photoresistor (not shown) and a power source (not shown), one end of the photoresistor is electrically connected to the power source and the other end of the photoresistor is electrically connected to the comparison unit 230 of the current adjustment module 20. The photoresistor receives light from the first light-emitting columns 400 and/or the second light-emitting columns 500 and the resistance of the photoresistor is changed according to the brightness of the first light-emitting columns 400 and/or the second light-emitting columns 500. A current flowing through the photoresistor is output from the output port of the brightness detection unit 210 to the comparison unit 230 as the detection current.

In the exemplary implementation, the brightness is inversely proportional to the resistance value of the photoresistor. That is, when the brightness is more greater, the resistance value of the photoresistor is more smaller, and the current flowing through the photoresistor is more greater and the detection current is more greater.

Figure 2:
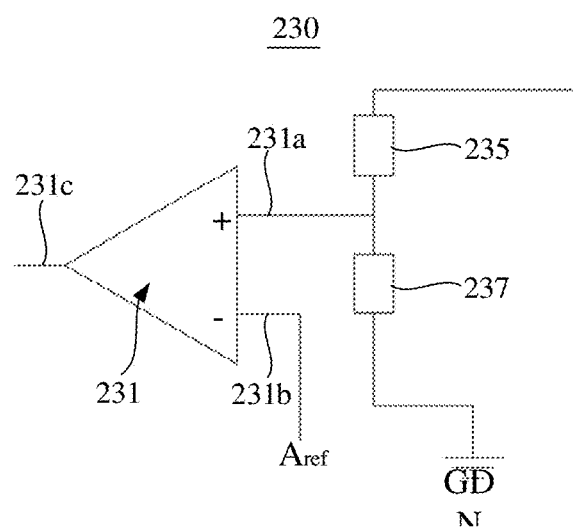
FIG. 2 is a schematic diagram of a comparison unit of a current adjustment module of the backlight driving circuit disclosed in the first implementation of the present disclosure.

Please refer to FIG. 2, which is the structural diagram of the comparison unit of the current adjustment module of the backlight driving circuit disclosed in the first implementation of the present disclosure. In the implementation of the present disclosure, the comparison unit 230 includes comparator 231, which includes a non-inverting input port 231a, an inverting input port 231b, and a comparison output port 231c. The non-inverting input port 231a is electrically connected with the output port of the brightness detection unit 210, the inverting input port 231b receives the preset reference current Aref, the comparison output port 231c is electrically connected with the switch control unit 250, the comparator 231 receives the sampling current through the non-inverting input port 231a.

When the sampling current is less than the preset reference current Aref, the comparison output port 231c outputs the first feedback signal to the switch control unit 250. The switch control unit 250 controls the switch unit 270 to electrically connect the second end of one of the first light-emitting columns 400 and the second end of one of the second light-emitting columns 500 with one of the first connecting wires 70 simultaneously according to the first feedback signal, and form the circuit loop with the power supply module 10 through the first connecting wire 70. That is, based on the first feedback signal, the switch control unit 250 controls said switch unit 270 to electrically connect one first light-emitting column 400 and one second light-emitting column 500 in parallel, and connects the first light-emitting column 400 and the second light-emitting column 500 connected in parallel with the first connecting wire 70, and form the circuit loop with the power supply module 10 through the first connecting wire 70.

When the sampling current is greater than or equal to the preset reference current Aref, the comparison output port 231c outputs the second feedback signal to the switch control unit 250. The switch control unit 250 controls the switch unit 270 to electrically connect the second end of one first light-emitting column 400 with one second connecting wire 80, and to electrically connect the second end of one second light-emitting column 500 with one second connecting wire 80, according to the second feedback signal.

In an exemplary implementation, the first feedback signal may be a low level voltage and the second feedback signal may be a high level voltage.

In the exemplary implementation, the magnitude of the preset reference current Aref can be adjusted and set according to the requirements of the circuit parameters, so that the current adjustment module 20 can be adapted to different types of power supply module 10, the universality of the current adjustment module 20 is enhanced. It is understood that different types of power supply module 10 correspond to different preset current ranges with higher conversion efficiency.

Please refer to FIG. 2, in the implementations of the present disclosure, the comparison unit 230 further comprises a first sampling resistor 235 and a second sampling resistor 237. The first sampling resistor 235 and the second sampling resistor 237 are connected in series between the output port of the brightness detection unit 210 and a grounded terminal GND, and the non-inverting input 231a is electrically connected between the first sampling resistor 235 and the second sampling resistor 237. The first sampling resistor 235 and the second sampling resistor 237 are used to sample the current at the output port of the brightness detection unit 210 to obtain the sampling current, the sampling current is proportional to the current at the output port of the brightness detection unit 210.

Referring to FIG. 1 again, in the implementations of the present disclosure, the current adjustment module 20 further comprises a filter unit 290, the filter unit 290 includes a first connection terminal 291 and a second connection terminal 292, the first connection terminal 291 is electrically connected to the output port of the brightness detection unit 210, the second connection terminal 292 is electrically connected to the grounded terminal GND. The filtering unit 290 is used to perform filtering operation for the detection current, thus to eliminate noise of the detection current.

In the exemplary implementation, the filter unit 290 comprises a capacitor, the capacitor is electrically connected between the output port of the brightness detection unit 210 and the grounded terminal GND.

In the exemplary implementation, the switch control unit 250 may be a corresponding functionally integrated chip.

Figure 3:
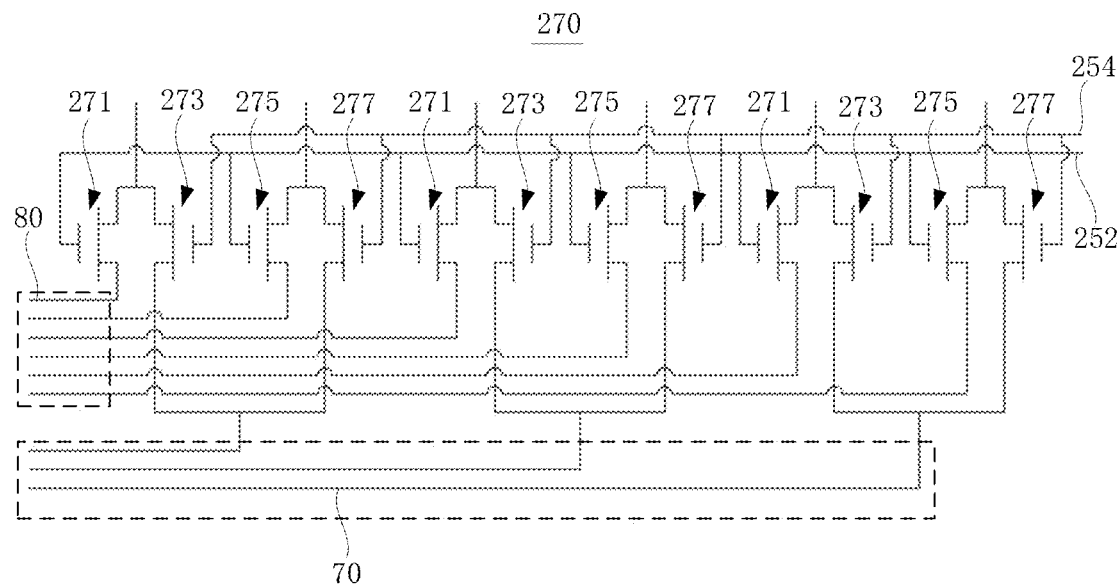
FIG. 3 is a schematic diagram of a switch unit of the current adjustment module of the backlight driving circuit disclosed in the first implementation of the present disclosure.

Please refer to FIG. 3, which is the schematic diagram of the switch unit of the current adjustment module of the backlight driving circuit disclosed in the first implementation of the present disclosure. In the implementation of the present disclosure, the switching unit 270 comprises a plurality of first transistors 271, a plurality of second transistors 273, a plurality of third transistors 275 and a plurality of fourth transistors 277, the switching control unit 250 comprises a first signal output terminal 252 and a second signal output terminal 254.

A gate of the first transistor 271 is electrically connected with the first signal output terminal 252 of the switch control unit 250, and a source of the first transistor 271 is electrically connected with the second end of one first light-emitting column 400. A drain of the first transistor 271 is electrically connected with one second connecting wire 80.

A gate of the second transistor 273 is electrically connected with the second signal output terminal 254 of the switch control unit 250. A source of the second transistor 273 is electrically connected with the source of the first transistor 271 and is further electrically connected with the second end of the first light-emitting column 400, namely, the sources of the second transistor 273 and the first transistor 271 are electrically connected to each other, and are electrically connected with the second end of the same first light-emitting column 400. A drain of the second transistor 273 is electrically connected with one first connecting wire 70.

A gate of the third transistor 275 is electrically connected with the gate of the first transistor 271 and the first signal output terminal 252 of the switch control unit 250. A source of the third transistor 275 is electrically connected with the second end of one second light-emitting column 500. A drain of the third transistor 275 is electrically connected with one second connecting wire 80.

A gate of the fourth transistor 277 is electrically connected with the gate of the second transistor 273 and the second signal output terminal 254 of the switch control unit 250. A source of the fourth transistor 277 is electrically connected to the source of the third transistor 275, and is further electrically connected to the second end of the second light-emitting column 500, namely, the sources of the fourth transistor 277 and the third transistor 275 are electrically connected to each other, and are electrically connected with the second end of the same second light-emitting column 500. A drain of the fourth transistor 277 is connected to the drain of the second transistor 273 and is further connected with the first connecting wire 70, namely, the drains of the fourth transistor 277 and the second transistor 273 are electrically connected to each other, and are connected to the same first connecting wire 70.

When the switch control unit 250 receives the first feedback signal (i.e. a feedback signal with a low level voltage), the switch control unit 250 outputs a first control signal via the first signal output terminal 252 and outputs a second control signal via the second signal output terminal 254 according to the first feedback signal. The first control signal controls the first transistor 271 and the third transistor 275 to turn off, the second control signal controls the second transistor 273 and the fourth transistor 277 to turn on.

When the switch control unit 250 receives the second feedback signal (i.e. a feedback signal with a high level voltage), the switch control unit 250 outputs the second control signal via the first signal output terminal 252 and outputs the first control signal via the second signal output terminal 254 according to the second feedback signal. The first control signal controls the second transistor 273 and the fourth transistor 277 to turn off, the second control signal controls the first transistor 271 and the third transistor 275 to turn on.

In the exemplary implementation, the number of the first transistors 271 is equal to the number of the second transistors 273 and is equal to the number of the first light-emitting columns 400, the number of the third transistor 275 is equal to the number of the fourth transistors 277 and is equal to the number of the second light-emitting columns 500.

It is understood that, the gates of a plurality of first transistors 271 and the gates of a plurality of third transistors 275 are electrically connected to the first signal output 252 of the switching control unit 250 simultaneously. The gates of a plurality of second transistor 273 and the gates of a plurality of fourth transistor 277 are electrically connected with the second signal output terminal 254 of the switching control unit 250 simultaneously. The second end of one first light-emitting column 400 is electrically connected with the source of the first transistor 271 and the source of the second transistor 273 simultaneously. The second end of one second light-emitting column 500 is electrically connected with the source of the third transistor 275 and the source of the fourth transistor 277 simultaneously. The drain of one first transistor 271 is electrically connected with one second connecting wire 80, and the drain of one third transistor 275 is electrically connected with one second connecting wires 80. The drain of the second transistor 273 and the drain of the fourth transistor 277 are electrically connected with one first connecting wire 70 simultaneously.

In the exemplary implementation, the transistors may be an N-type MOSFET (Metal-Oxide-Semiconductor Field Effect Transistor) or a P-type MOSFET. The types of the first transistor 271 and the third transistor 275 are the same, and the types of the second transistor 273 and the fourth transistor 277 are the same.

In the exemplary implementation, the first control signal may be a high level voltage and the second control signal may be a low level voltage; alternatively, the first control signal may be the low level voltage and the second control signal may be the high level voltage; alternatively, both the first control signal and the second control signal may be the high level voltage or the low level voltage.

In conclusion, the backlight driving circuit 100 provided in the implementation of the present disclosure includes the power supply module 10, the current adjustment module 20, the plurality of first connecting wires 70, and the plurality of second connecting wires 80. The power supply module 10 drives the plurality of first light-emitting columns 400 and the plurality of second light-emitting columns 500 to emit light. The current adjustment module 20 comprises the brightness detection unit 210, the comparison unit 230, the switch control unit 250 and the switch unit 270. The brightness detection unit 210 detects the brightness of the first light-emitting columns 400 and/or the second light-emitting columns 500, and generate the detection current based on the brightness detected. The detection current is output from the output port of the brightness detection unit 210 to the comparison unit 230. The comparison unit 230 is used to sample the detection current at the output port of the brightness detection unit 210 to obtain the sampling current and to compare the sampling current with the preset reference current. When the sampling current is less than the preset reference current, the comparison unit 230 is used to output the first feedback signal to the switch control unit 250, and the switch control unit 250 controls the switch unit 270 to electrically connect the second end of one of the first light-emitting columns 400 and the second end of one of the second light-emitting columns 500 with one of the first connecting wires 70 simultaneously according to the first feedback signal, and form a circuit loop with the power supply module 10 through the first connecting wire 70. When the sampling current is greater than or equal to the preset reference current, the comparison unit 230 is used to output a second feedback signal to the switch control unit 250, and the switch control unit 250 controls the switch unit 270 to electrically connect the second end of one first light-emitting column 400 with one second connecting wire 80, and to electrically connect the second end of one second light-emitting column 500 with one second connecting wire 80, according to the second feedback signal, thus to cause the current flowing through the second connecting wire 80 is equal to the current flowing through the first light-emitting column 400 and is equal to the current flowing through the second light-emitting column 500. Therefore, on the premise that the brightness of the first light-emitting columns 400 or the second light-emitting columns 500 remains unchanged, by changing the connection mode between the second end of the first light-emitting columns 400 and the second end of the second light-emitting columns 500, the current flowing back to the power supply module 10 is within the preset current range. Thus, the conversion efficiency of the power supply module 10 is improved, the power consumption is low and the power utilization rate is improved.

Figure 4:
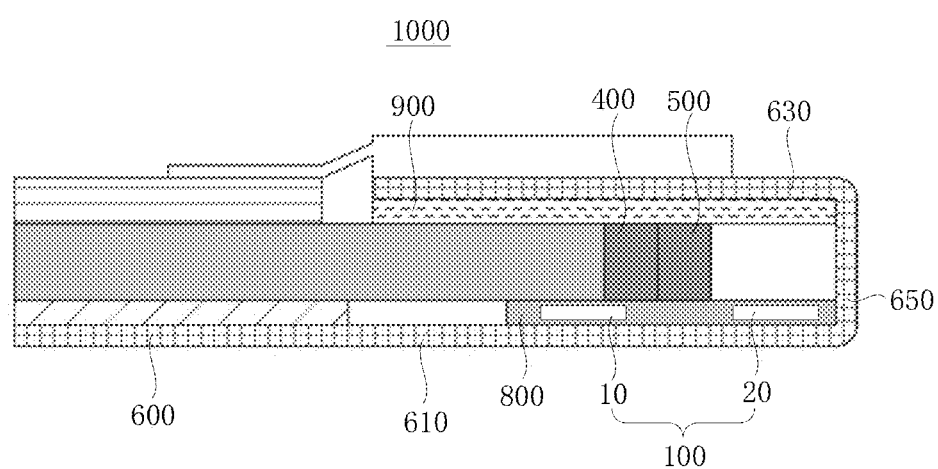
FIG. 4 is a schematic diagram of a first layer structure of the backlight module disclosed in a second implementation of the present disclosure.

Based on the same conception, the implementation of the present disclosure also provides a backlight module. Please refer to FIG. 4, which is a schematic diagram of the first layer structure of the backlight module disclosed in the second implementation of the present disclosure. The backlight module 1000 comprises the plurality of first light-emitting columns 400, the plurality of second light-emitting columns 500, a back plate 600, a circuit board 800, a reflective layer 900 and the above backlight driving circuit 100.

The back plate 600 comprises a first fixing plate 610, a second fixing plate 630 and a connecting plate 650. The first fixing plate 610 and the second fixing plate 630 are arranged relative to each other, the connecting plate 650 is fixedly connected between the first fixing plate 610 and the second fixing plate 630. The circuit board 800 is arranged on one side, of the first fixing plate 610, facing the second fixing plate 630, and the reflection layer 900 is arranged on one side, of the second fixing plate 630, facing the first fixing plate 610. The first light-emitting columns 400 and the second light-emitting columns 500 are arranged between the circuit board 800 and the reflection layer 900. The backlight driving circuit 100 is arranged on the circuit board 800.

In the implementation of the present disclosure, the first fixing plate 610, the second fixing plate 630, and the connecting plate 650 may be made by an integrated molding and bent to form the back plate 600.

In the exemplary implementation, the reflective layer 900 is used to reflect the light emitted by the first light-emitting columns 400 and the second light-emitting columns 500, thus to improve the optical output rate of the backlight module 1000.

Figure 5:
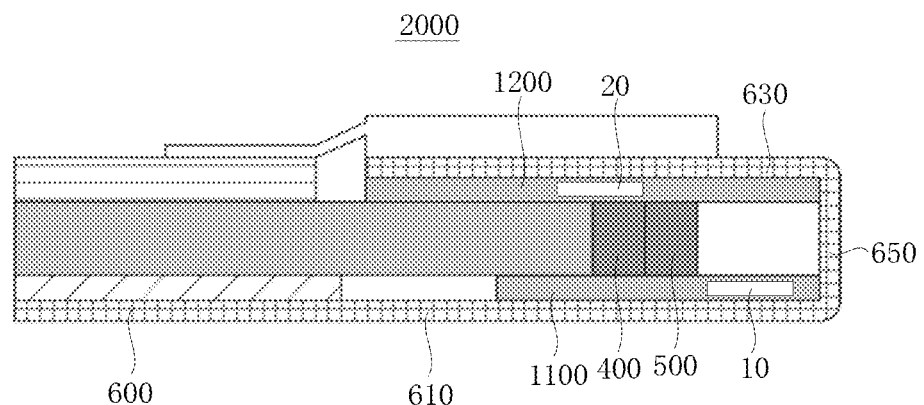
FIG. 5 is a schematic diagram of a second layer structure of the backlight module disclosed in a second implementation of the present disclosure.

Please refer to FIG. 5, which is a schematic diagram of the second layer structure of the backlight module disclosed in the second implementation of the present disclosure. In the implementation of the present disclosure, the backlight module 2000 comprises the plurality of first light-emitting columns 400, the plurality of second light-emitting columns 500, a back plate 600, a first circuit board 1100, a second circuit board 1200, and the above backlight driving circuit 100.

The back plate 600 comprises a first fixing plate 610, a second fixing plate 630 and a connecting plate 650. The first fixing plate 610 and the second fixing plate 630 are arranged relative to each other, the connecting plate 650 is fixedly connected between the first fixing plate 610 and the second fixing plate 630. The first circuit board 1100 is arranged on one side, of the first fixing board 610, facing the second fixing board 630, and the second circuit board 1200 is arranged on one side, of the second fixing board 630, facing the first fixing board 610. The first light-emitting columns 400 and the second light-emitting columns 500 are arranged between the first circuit board 1100 and the second circuit board 1200. The backlight driving circuit 100 comprises the power supply module 10 and the current adjustment module 20, the power supply module 10 is arranged on the first circuit board 1100, and the current adjustment module 20 is arranged on the second circuit board 1200. The backlight driving circuit 100 has been described in detail in the implementation as shown in FIG. 1 to FIG. 3 above, so here not to repeat it here.

In the implementation of the present disclosure, the first fixing plate 610, the second fixing plate 630, and the connecting plate 650 may be made by an integrated molding and bent to form the back plate 600.

It is understood that, the second circuit board 1200 of the second backlight module 2000 replaces the position of the reflection layer 900 of the first backlight module 1000. A reflective medium can be coated on a surface, of the second circuit board 1200, facing the first light-emitting columns 400 and the second light-emitting columns 500, such that the second circuit board 1200 has the function of the reflective layer 900. Therefore, compared with the first backlight module 1000, the second backlight module 2000 reduces assembly parts, saves cost and improves yield.

In the implementations of the present disclosure, the backlight module 1000 (2000) may be a side lighting backlight module. In other implementation, the backlight module 1000 (2000) may also be a direct lighting backlight module, the present disclosure does not make specific restrictions on this.

In the implementations of the present disclosure, the circuit board 800, the first circuit board 1100, and the second circuit board 1200 may be flexible printed circuit (FPC) or printed circuit board (PCB), the present disclosure does not make specific restrictions on this.

In the implementations of the present disclosure, the backlight module may also include a light guide layer, a reflection plate, an optical film component and other necessary components and constituent parts. The person skilled in this field can supplement the backlight module according to its specific type and actual functions, which will not be detail described here.

In conclusion, the backlight module 1000 (2000) provided in the implementation of the present disclosure includes the back plate 600 and the backlight driving circuit 100 mentioned above. The backlight driving circuit 100 comprises the power supply module 10, the current adjustment module 20, the plurality of first connecting wires 70 and the plurality of second connecting wires 80. The power supply module 10 drives the plurality of first light-emitting columns 400 and the plurality of second light-emitting columns 500 to emit light. The current adjustment module 20 comprises the brightness detection unit 210, the comparison unit 230, the switch control unit 250 and the switch unit 270. The brightness detection unit 210 detects the brightness of the first light-emitting columns 400 and/or the second light-emitting columns 500, and generate the detection current based on the brightness detected, the detection current is output from the output port of the brightness detection unit 210. The comparison unit 230 is used to sample the detection current at the output port of the brightness detection unit 210 to obtain the sampling current, and compare the sampling current with the preset reference current. When the sampling current is less than the preset reference current, the comparison unit 230 is used to output the first feedback signal to the switch control unit 250, and the switch control unit 250 controls the switch unit 270 to electrically connect the second end of one of the first light-emitting columns 400 and the second end of one of the second light-emitting columns 500 with one of the first connecting wires 70 simultaneously according to the first feedback signal, thus to form the circuit loop with the power supply module 10 through the first connecting wire 70. When the sampling current is greater than or equal to the preset reference current, the comparison unit 230 is used to output the second feedback signal to the switch control unit 250, and the switch control unit 250 controls the switch unit 270 to electrically connect the second end of one first light-emitting column 400 with one second connecting wire and to electrically connect the second end of one second light-emitting column 500 with one second connecting wire 80, according to the second feedback signal, thus to cause the current flowing through the second connecting wire 80 is equal to the current flowing through the first light-emitting column 400 and is equal to the current flowing through the second light-emitting column 500. Therefore, the backlight module of the present disclosure, on the premise that the brightness of said first light-emitting columns 400 or said second light-emitting columns 500 remains unchanged, by changing the connection mode between the second end of the first light-emitting columns 400 and the second end of the second light-emitting columns 500, the current flowing back to the power supply module 10 is caused to be within the preset current range. The conversion efficiency of the power supply module 10 is improved, the power consumption is low and the power utilization rate is improved, and the market competitiveness of the backlight module 1000 is improved accordingly.

Figure 6:
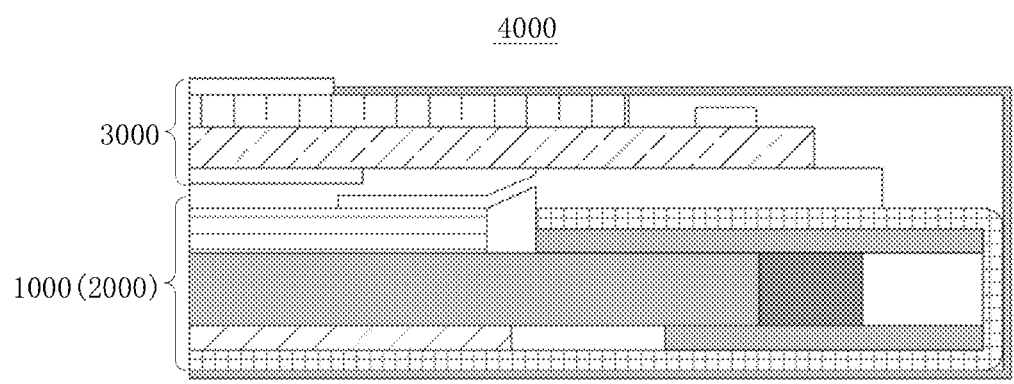
FIG. 6 is a schematic diagram of a layer structure of a display device disclosed in a third implementation of the present disclosure.

Based on the same conception, the implementation of the present disclosure also provides a display device. Please refer to FIG. 6, which is a schematic diagram of the layer structure of the display device disclosed in a third implementation of the present disclosure. The display device 4000 comprises a display panel 3000 and the above backlight module 1000 (2000). The display panel 3000 is stacked with the backlight module 1000 (2000), and the display panel 3000 is located at a light outlet side of the backlight module 1000 (2000). The display panel 3000 is used to display images under the backlight provided by the backlight module 1000 (2000). Since the backlight driving circuit 100 and the backlight module 1000 (2000) have been detail described in the implementation as shown in FIG. 1 to FIG. 4 above, the backlight driving circuit 100 and the backlight Module 1000 (2000) are not described here again.

In the implementation of the present disclosure, the brightness range provided by the backlight module 1000 (2000) can be 100 nits to 2000 nits, therein, nits may also be candela per square meter (cd/m2), which is a physical quantity of brightness intensity on a surface of a light-emitting object.

It is understood that, when the display device 4000 under different work condition, for example, in a bright environment or a dark environment, the backlight module 1000 (2000) needs to provide backlight with different brightness to the display panel 3000. The backlight module 1000 (2000) can also provide backlight with different brightness levels according to user's customized settings.

In an exemplary implementation, the display device may be used for electronic devices including, but not limited to, tablet computers, laptop computers, desktop computers, etc. According to the implementation of the present disclosure, the detail type of the display device is not subject to special restrictions, and the persons skilled in this field can design according to the specific use requirements of the electronic device equipping the display device, which will not be detail described here.

In the exemplary implementation, the display device also includes other necessary components and constituent parts such as a driving board, a power source board, a high voltage board, and a control panel with keys, etc. The persons skilled in the field may supplement the display device according to its specific type and actual function, which will not be detail described here.

In the exemplary implementation, the display panel 3000 may include other necessary components and constituent parts such as a lower polarizer, an array substrate, a color substrate and an upper polarizer stacked in sequence, which may be supplemented by persons skilled in the field according to the detail type and actual function of the display device, and will not be detail described here.

In conclusion, the display device 4000 provided in the implementations of the present disclosure embodiment includes the display panel and the backlight module 1000 (2000). The backlight module 1000 (2000) comprises the backlight 600 and the backlight driving circuit 100. The backlight driving circuit 100 comprises the power supply module 10, the current adjustment module 20, the plurality of first connecting wires 70 and the plurality of second connecting wires 80. The power supply module 10 drives the plurality of first light-emitting columns 400 and the plurality of second light-emitting columns 500 to emit light. The current adjustment module 20 comprises the brightness detection unit 210, the comparison unit 230, the switch control unit 250 and the switch unit 270. The brightness detection unit 210 detects the brightness of the first light-emitting columns 400 and/or the second light-emitting columns 500, and generate the detection current based on the brightness detected, the detection current is output from the output port of the brightness detection unit 210. The comparison unit 230 is used to sample the detection current at the output port of the brightness detection unit 210 to obtain the sampling current, and compare the sampling current with the preset reference current. When the sampling current is less than the preset reference current, the comparison unit 230 is used to output the first feedback signal to the switch control unit 250, and the switch control unit 250 controls the switch unit 270 to electrically connect the second end of one of the first light-emitting columns 400 and the second end of one of the second light-emitting columns 500 with one of the first connecting wires 70 simultaneously according to the first feedback signal, thus to form the circuit loop with the power supply module 10 through the first connecting wire 70. When the sampling current is greater than or equal to the preset reference current, the comparison unit 230 is used to output the second feedback signal to the switch control unit 250, and the switch control unit 250 controls the switch unit 270 to electrically connect the second end of one first light-emitting column 400 with one second connecting wire 80, and to electrically connect the second end of one second light-emitting column 500 with one second connecting wire 80, according to the second feedback signal, thus to cause the current flowing through the second connecting wire 80 is equal to the current flowing through the first light-emitting column 400 and is equal to the current flowing through the second light-emitting column 500. Therefore, the display device of the present disclosure, on the premise that the brightness of said first light-emitting columns 400 or said second light-emitting columns 500 remains unchanged, by changing the connection mode between the second end of the first light-emitting columns 400 and the second end of the second light-emitting columns 500, the current flowing back to the power supply module 10 is caused to be within the preset current range. The conversion efficiency of the power supply module 10 is improved, the power consumption is low and the power utilization rate is improved, and the market competitiveness of the display device 4000 is improved accordingly.

Based on the same conception, the implementations of the present disclosure also provides a backlight driving method applied to the backlight driving circuit described in FIG. 1 to FIG. 3. The content of the backlight driving circuit involved in the backlight driving method in the fourth implementation of the present disclosure, please refer to the relevant description of the backlight driving circuit in the first implementation, which will not be detail described here. Please refer to FIG. 7, which is a flow diagram of the backlight driving method disclosed in the fourth implementation of the present disclosure. The backlight driver method can at least include the following steps.

S410, a power supply module 10, a plurality of first light-emitting columns 400 connected in parallel, and a plurality of second light-emitting columns 500 connected in parallel are provided, the power supply module 10 is electrically connected with first ends of the first light-emitting columns 400 and first ends of the second light-emitting columns 500, second ends of the plurality of the first light-emitting columns 400 and second ends of the plurality of the second light-emitting columns 500 are electrically connected with the power supply module 10 selectively through a plurality of first connecting wires 70 or a plurality of second connecting wires 80.

In detail, in the implementation of the present disclosure, the power supply module 10, the current adjustment module 20, the plurality of first light-emitting columns 400 connected in parallel, and the plurality of second light-emitting columns 500 connected in parallel are provided. The power supply module 10 is electrically connected with the first ends of the first light-emitting columns 400 and the first ends of the second light-emitting columns 500. The current adjustment module 20 is electrically connected with the second ends of the plurality of first light-emitting columns 400 and the second ends of the plurality of second light-emitting columns 500, the current adjustment module 20 is also electrically connected to the power supply module 10 by selectively through the plurality of first connecting wires 70 or the plurality of second connecting wires 80. The current adjustment module 20 includes a brightness detection unit 210, a comparison unit 230, a switch control unit 250 and a switch unit 270.

In the implementations of the present disclosure, the number of the first light-emitting columns 400 is equal to the number of the second light-emitting columns 500, the number of the first connecting wires 70 is equal to the number of the first light-emitting columns 400 or the number of the second light-emitting columns 500, the number of the second connecting wires 80 is twice the number of the first light-emitting columns 400.

S420, a detection current is obtained based on the brightness of the first light-emitting columns 400 and/or the second light-emitting columns 500.

In detail, in the implementation of the present disclosure, the corresponding detection current can be obtained by the brightness detection unit 210 according to the brightness of the first light-emitting columns 400 and/or the second light-emitting columns 500.

In the exemplary implementation, the brightness detection unit 210 may be an light sensor.

S430, based on the magnitude of the detection current, the second end of one of the first light-emitting columns 400 and the second end of one of the second light-emitting columns 500 are electrically connected with one of the first connecting wires 70 simultaneously, or the second end of one of the first light-emitting columns 400 is electrically connected to one of the second connecting wires 80 and the second end of one of the second light-emitting columns 500 is electrically connected to another of the second connecting wires 80 respectively, namely, the second end of one of the first light-emitting columns 400 and the second end of one of the second light-emitting columns 500 are respectively electrically connected to two of the second connecting wires 80.

Figure 8:
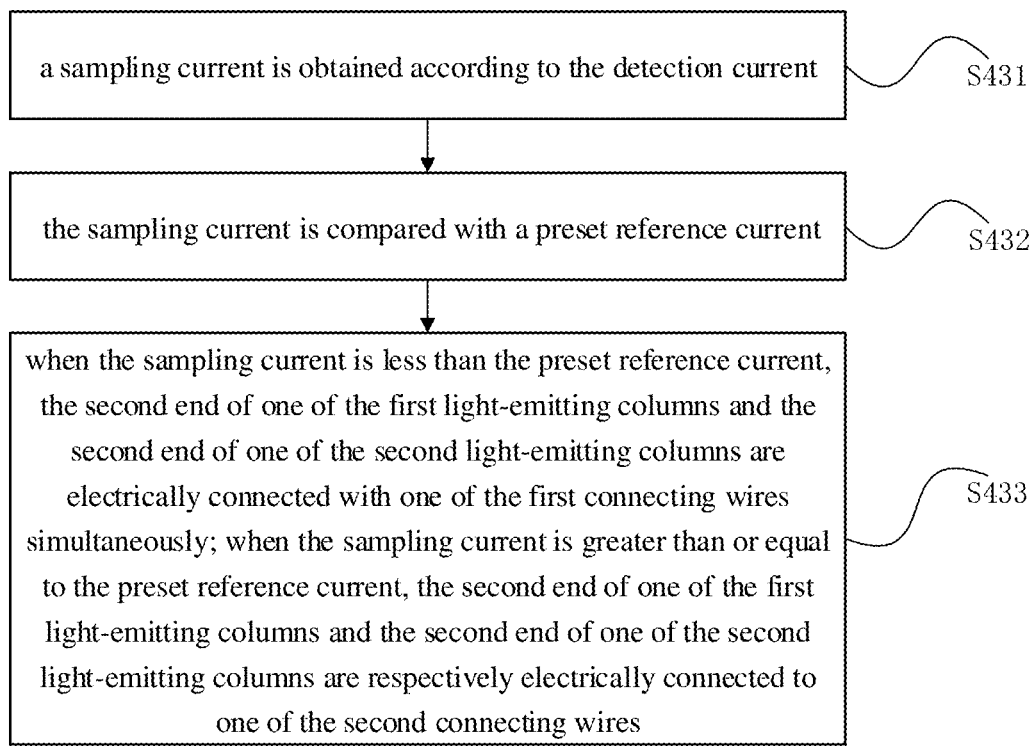
FIG. 8 is a flow diagram of step 5430 of the backlight driving method disclosed in the fourth implementation of present disclosure.

Please refer to FIG. 8, which is a flow diagram of step S430 of the backlight driving method disclosed in the fourth implementation of present disclosure. The step S430 may include at least the following steps.

S431, a sampling current is obtained according to the detection current.

In detail, in the implementations of the present disclosure, the sampling current is obtained by the comparison unit 230 according to the detection current.

In the implementations of the present disclosure, the sampling current is proportional to the detection current.

S432, the sampling current is compared with a preset reference current.

In detail, in the implementations of the present disclosure, the sampling current is compared with the preset reference current by the comparison unit 230.

S433, when the sampling current is less than the preset reference current, the second end of one of the first light-emitting columns 400 and the second end of one of the second light-emitting columns 500 are electrically connected with one of the first connecting wires 70 simultaneously; when the sampling current is greater than or equal to the preset reference current, the second end of one of the first light-emitting columns 400 is electrically connected to one of the second connecting wires 80 and the second end of one of the second light-emitting columns 500 is electrically connected to another of the second connecting wires 80 respectively, namely, the second end of one of the first light-emitting columns 400 and the second end of one of the second light-emitting columns 500 are respectively electrically connected to two of the second connecting wires 80.

In detail, in the implementation of the present disclosure, if the sampling current is less than the preset reference current, the comparison unit 230 outputs a first feedback signal to the switch control unit 250, the switch control unit 250 controls the switch unit 270 to electrically connect the second end of one of the first light-emitting columns 400 and the second end of one of the second light-emitting columns 500 with one of the first connecting wires 70 simultaneously according to the first feedback signal.

If the sampling current is greater than or equal to the preset reference current, the comparison unit 230 outputs a second feedback signal to the switch control unit 250. The switch control unit 250 controls the switch unit 270 to electrically connect the second end of one of the first light-emitting columns 400 to one second connecting wires 80, and to electrically connect the second end of one second light-emitting column 500 with another second connecting wire 80, according to the second feedback signal.

In conclusion, the backlight driving method provided in the implementations of the present disclosure includes: the power supply module 10, the plurality of first light-emitting columns 400 connected in parallel, and the plurality of second light-emitting columns 500 connected in parallel are provided, the power supply module 10 is electrically connected with the first ends of the first light-emitting columns 400 and the first ends of the second light-emitting columns 500, and the second ends of the plurality of the first light-emitting columns 400 and the second ends of the plurality of the second light-emitting columns 500 are electrically connected with the power supply module 10 selectively through the plurality of first connecting wires 70 or the plurality of second connecting wires 80; the detection current is obtained based on the brightness of the plurality of first light-emitting columns 400 and/or the plurality of the second light-emitting columns 500; based on the magnitude of the detection current, the second end of one of the first light-emitting columns 400 and the second end of one of the second light-emitting columns 500 are simultaneously electrically connected with one of the first connecting wires 70, or the second end of one of the first light-emitting columns 400 is electrically connected to one of the second connecting wires 80 and the second end of one of the second light-emitting columns is electrically connected to another of the second connecting wires 80 respectively. Therefore, on the premise that the brightness of the first light-emitting columns 400 or the second light-emitting columns 500 are maintained to be unchanged, by changing the connection mode of the second end of the first light-emitting columns 400 and the second end of the second light-emitting columns 500, the current flowing back to the power supply module 10 is caused to be within the preset current range. Thus, the conversion efficiency of the power supply module is improved, low power consumption is realized and the power utilization rate is improved.

The flowchart described in present disclosure is only an example, which can be modified in a variety of ways without departing from the spirit of present disclosure. For example, these steps can be performed in different order, or certain steps can be added, deleted, or modified. A general technical person in the field may understand all or part of the process for realizing the above implementations, and equivalent changes made in accordance with the claims of the present disclosure shall remain within the scope of present disclosure.

In the description of this specification, references to the terms "an implementation", "some implementations", "schematic implementations", "examples", "specific examples" or "some examples", etc., which describe the specific features, structures, materials or characteristics combined with the descriptions of said implementations or examples, are included in at least one implementation or example of the present disclosure. In this specification, schematic representations of the above terms do not necessarily refer to the same implementations or examples. Furthermore, the specific features, structures, materials, or characteristics of the description can be combined in an appropriate manner in any one or more implementations or examples.

It should be understood that the application of present disclosure is not limited to the above examples, and may be improved or transformed according to the above description for general technical person in the field. All such improvements and transformations shall fall within the scope of protection of the claims attached in the present disclosure. A general technical person in the field may understand all or part of the means by which the above implementations are realized, and equivalent changes made in accordance with the claims of the present disclosure shall remain within the scope of present disclosure.

What is claimed is:

1. A backlight driving circuit, comprising a power supply module configured to provide power signals to a plurality of first light-emitting columns connected in parallel and a plurality of second light-emitting columns connected in parallel, wherein the backlight driving circuit further comprises a current adjustment module, a plurality of first connecting wires and a plurality of second connecting wires;
    wherein the power supply module is electrically connected with first ends of the first light-emitting columns and first ends of the second light-emitting columns; the current adjustment module is electrically connected with second ends of the first light-emitting columns and second ends of the second light-emitting columns simultaneously, and the current adjustment module is electrically connected to the power supply module selectively through the plurality of first connecting wires or the plurality of second connecting wires; the current adjustment module is used to detect brightness of the first light-emitting columns and/or brightness of the second light-emitting columns to obtain a detection current, and compare the detection current with a mode switching current;
    when the detection current is less than the mode switching current, the current adjustment module controls the second end of one of the first light-emitting columns and the second end of one of the second light-emitting columns electrically connect with one of the first connecting wires simultaneously;
    when the detection current is greater than or equal to the mode switching current, the current adjustment module controls the second end of one of the first light-emitting columns to connect with one of the second connecting wires, and controls the second end of one of the second light-emitting columns to electrically connect with one another of the second connecting wires.

2. The backlight driving circuit according to claim 1, wherein the current adjustment module comprises a brightness detection unit, a comparison unit, a switch control unit, and a switch unit, an output port of the brightness detection unit is electrically connected to the comparison unit, the comparison unit is electrically connected to the switch control unit, the switch control unit is further electrically connected to the switch unit;
    the brightness detection unit is configured to detect the brightness of the first light-emitting columns and/or the second light-emitting columns, and generate the detection current based on the brightness detected, the output port of the brightness detection unit outputs the detection current to the comparison unit; the comparison unit is configured to sample the detection current to obtain a sampling current and compare the sampling current with a preset reference current;
    when the sampling current is less than the preset reference current, the comparison unit outputs a first feedback signal to the switch control unit, and the switch control unit controls the switch unit to electrically connect the second end of one of the first light-emitting columns and the second end of one of the second light-emitting columns with one of the first connecting wires simultaneously according to the first feedback signal;
    when the sampling current is greater than or equal to the preset reference current, the comparison unit outputs a second feedback signal to the switch control unit, and the switch control unit controls the switch unit to electrically connect the second end of one first light-emitting column with one second connecting wire, and to electrically connect the second end of one second light-emitting column with another second connecting wire, according to the second feedback signal.

3. The backlight driving circuit according to claim 2, wherein the comparison unit comprises a comparator, the comparator comprises a non-inverting input port, an inverting input port, and a comparison output port, the non-inverting input port is electrically connected with the output port of the brightness detection unit, the inverting input port receives the preset reference current, the comparison output port is electrically connected with the switch control unit, the comparator receives the sampling current through the non-inverting input port;

when the sampling current is less than the preset reference current, the comparison output port outputs the first feedback signal to the switch control unit, to cause the switch control unit to control the switch unit to electrically connect the second end of one of the first light-emitting columns and the second end of one of the second light-emitting columns with one of the first connecting wires simultaneously according to the first feedback signal;

when the sampling current is greater than or equal to the preset reference current, the comparison output port outputs the second feedback signal to the switch control unit, to cause the switch control unit to control the switch unit to electrically connect the second end of one first light-emitting column with one second connecting wire, and to electrically connect the second end of one second light-emitting column with another second connecting wire, according to the second feedback signal.

4. The backlight driving circuit according to claim 3, wherein the comparison unit further comprises a first sampling resistor and a second sampling resistor, the first sampling resistor and the second sampling resistor are connected in series between the output port of the brightness detection unit and a grounded terminal, and the non-inverting input is electrically connected between the first sampling resistor and the second sampling resistor, the first sampling resistor and the second sampling resistor sample a current at the output port of the brightness detection unit to obtain the sampling current.

5. The backlight driving circuit according to claim 2, wherein the switching unit comprises a plurality of first transistors, a plurality of second transistors, a plurality of third transistors and a plurality of fourth transistors, the switching control unit comprises a first signal output terminal and a second signal output terminal;

a gate of the first transistor is electrically connected with the first signal output terminal of the switch control unit, a source of the first transistor is electrically connected with the second end of one first light-emitting column, and a drain of the first transistor is electrically connected with one second connecting wire;

a gate of the second transistor is electrically connected with the second signal output terminal of the switch control unit, a source of the second transistor is electrically connected with the second end of the first light-emitting column, a drain of the second transistor is electrically connected with one first connecting wire;

a gate of the third transistor is electrically connected with the gate of the first transistor and the first signal output terminal of the switch control unit, a source of the third transistor is electrically connected with the second end of one second light-emitting column, a drain of the third transistor is electrically connected with one second connecting wire;

a gate of the fourth transistor is electrically connected with the gate of the second transistor and the second signal output terminal of the switch control unit, a source of the fourth transistor is electrically connected to the second end of the second light-emitting column, a drain of the fourth transistor is connected to the drain of the second transistor and is further connected with the first connecting wire.

6. The backlight driving circuit according to claim 5, wherein when the switch control unit receives the first feedback signal, the switch control unit outputs a first control signal via the first signal output terminal and outputs a second control signal via the second signal output terminal according to the first feedback signal, the first control signal controls the first transistor and the third transistor to turn off, the second control signal controls the second transistor and the fourth transistor to turn on;

when the switch control unit receives the second feedback signal, the switch control unit outputs the second control signal via the first signal output terminal and outputs the first control signal via the second signal output terminal according to the second feedback signal, the first control signal controls the second transistor and the fourth transistor to turn off, the second control signal controls the first transistor and the third transistor to turn on.

7. The backlight driving circuit according to claim 2, wherein the current adjustment module further comprises a filter unit, the filter unit comprises a first connection terminal and a second connection terminal, the first connection terminal is electrically connected to the output port of the brightness detection unit, the second connection terminal is electrically connected to the grounded terminal, he filtering unit is configured to perform filtering operation for the detection current.

8. A backlight module, comprising a back plate, the back plate comprises a first fixing plate, a second fixing plate and a connecting plate, the first fixing plate and the second fixing plate being arranged relative to each other, the connecting plate being fixedly connected between the first fixing plate and the second fixing plate; wherein the backlight module further comprises a plurality of first light-emitting columns, a plurality of second light-emitting columns, a first circuit board, a second circuit board, and a backlight driving circuit, wherein the first circuit board is arranged on one side, of the first fixing board, facing the second fixing board, and the second circuit board is arranged on one side, of the second fixing board, facing the first fixing board; the first light-emitting columns and the second light-emitting columns are arranged between the first circuit board and the second circuit board, the backlight driving circuit comprises a power supply module and a current adjustment module, the power supply module is arranged on the first circuit board, and the current adjustment module is arranged on the second circuit board; the power supply module is configured to provide power signals to a plurality of first light-emitting columns connected in parallel and a plurality of second light-emitting columns connected in parallel, wherein the backlight driving circuit further comprises a plurality of first connecting wires and a plurality of second connecting wires; wherein the power supply module is electrically connected with first ends of the first light-emitting columns and first ends of the second light-emitting columns; the current adjustment module is electrically connected with second ends of the first light-emitting columns and second ends of the second light-emitting columns simultaneously, and the current adjustment module is electrically connected to the power supply module selectively through the plurality of first connecting wires or the plurality of second connecting wires; the current adjustment module is used to detect brightness of the first light-emitting columns and/or brightness of the second light-emitting columns to obtain a detection current, and compare the detection current with a mode switching current;

when the detection current is less than the mode switching current, the current adjustment module controls the second end of one of the first light-emitting columns and the second end of one of the second light-emitting columns electrically connect with one of the first connecting wires simultaneously; when the detection current is greater than or equal to the mode switching current, the current adjustment module controls the second end of one of the first light-emitting columns to connect with one of the second connecting wires, and controls the second end of one of the second light-emitting columns to electrically connect with another of the second connecting wires.

9. The backlight module according to claim 8, wherein the current adjustment module comprises a brightness detection unit, a comparison unit, a switch control unit, and a switch unit, an output port of the brightness detection unit is electrically connected to the comparison unit, the comparison unit is electrically connected to the switch control unit, the switch control unit is further electrically connected to the switch unit;

the brightness detection unit is configured to detect the brightness of the first light-emitting columns and/or the second light-emitting columns, and generate the detection current based on the brightness detected, the output port of the brightness detection unit outputs the detection current to the comparison unit; the comparison unit is configured to sample the detection current to obtain a sampling current and compare the sampling current with a preset reference current;

when the sampling current is less than the preset reference current, the comparison unit outputs a first feedback signal to the switch control unit, and the switch control unit controls the switch unit to electrically connect the second end of one of the first light-emitting columns and the second end of one of the second light-emitting columns with one of the first connecting wires simultaneously according to the first feedback signal;

when the sampling current is greater than or equal to the preset reference current, the comparison unit outputs a second feedback signal to the switch control unit, and the switch control unit controls the switch unit to electrically connect the second end of one first light-emitting column with one second connecting wire, and to electrically connect the second end of one second light-emitting column with another second connecting wire, according to the second feedback signal.

10. The backlight module according to claim 9, wherein the comparison unit comprises a comparator, the comparator comprises a non-inverting input port, an inverting input port, and a comparison output port, the non-inverting input port is electrically connected with the output port of the brightness detection unit, the inverting input port receives the preset reference current, the comparison output port is electrically connected with the switch control unit, the comparator receives the sampling current through the non-inverting input port;

when the sampling current is less than the preset reference current, the comparison output port outputs the first feedback signal to the switch control unit, to cause the switch control unit to control the switch unit to electrically connect the second end of one of the first light-emitting columns and the second end of one of the second light-emitting columns with one of the first connecting wires simultaneously according to the first feedback signal;

when the sampling current is greater than or equal to the preset reference current, the comparison output port outputs the second feedback signal to the switch control unit, to cause the switch control unit to control the switch unit to electrically connect the second end of one first light-emitting column with one second connecting wire, and to electrically connect the second end of one second light-emitting column with one another second connecting wire, according to the second feedback signal.

11. The backlight module according to claim 10, wherein the comparison unit further comprises a first sampling resistor and a second sampling resistor, the first sampling resistor and the second sampling resistor are connected in series between the output port of the brightness detection unit and a grounded terminal, and the non-inverting input is electrically connected between the first sampling resistor and the second sampling resistor, the first sampling resistor and the second sampling resistor sample a current at the output port of the brightness detection unit to obtain the sampling current.

12. The backlight module according to claim 9, wherein the switching unit comprises a plurality of first transistors, a plurality of second transistors, a plurality of third transistors and a plurality of fourth transistors, the switching control unit comprises a first signal output terminal and a second signal output terminal;

a gate of the first transistor is electrically connected with the first signal output terminal of the switch control unit, a source of the first transistor 271 is electrically connected with the second end of one first light-emitting column, and a drain of the first transistor is electrically connected with one second connecting wire;

a gate of the second transistor is electrically connected with the second signal output terminal of the switch control unit, a source of the second transistor is electrically connected with the second end of the first light-emitting column, a drain of the second transistor is electrically connected with one first connecting wire;

a gate of the third transistor is electrically connected with the gate of the first transistor and the first signal output terminal of the switch control unit, a source of the third transistor is electrically connected with the second end of one second light-emitting column, a drain of the third transistor is electrically connected with one second connecting wire;

a gate of the fourth transistor is electrically connected with the gate of the second transistor and the second signal output terminal of the switch control unit, a source of the fourth transistor is electrically connected to the second end of the second light-emitting column, a drain of the fourth transistor is connected to the drain of the second transistor and is further connected with the first connecting wire.

13. The backlight module according to claim 12, wherein when the switch control unit receives the first feedback signal, the switch control unit outputs a first control signal via the first signal output terminal and outputs a second control signal via the second signal output terminal according to the first feedback signal, the first control signal controls the first transistor and the third transistor to turn off, the second control signal controls the second transistor and the fourth transistor to turn on;

when the switch control unit receives the second feedback signal, the switch control unit outputs the second control signal via the first signal output terminal and outputs the first control signal via the second signal output terminal according to the second feedback signal, the first control signal controls the second transistor and the fourth transistor to turn off, the second control signal controls the first transistor and the third transistor to turn on.

14. A display device, comprising a display panel and a backlight module, wherein the display panel is located at a light outlet side of the backlight module, the display panel displays images under backlight provided by the backlight module, the backlight module comprises a back plate, the back plate comprises a first fixing plate, a second fixing plate and a connecting plate, the first fixing plate and the second fixing plate being arranged relative to each other, the connecting plate being fixedly connected between the first fixing plate and the second fixing plate; wherein the backlight module further comprises a plurality of first light-emitting columns, a plurality of second light-emitting columns, a first circuit board, a second circuit board, and a backlight driving circuit, wherein the first circuit board is arranged on one side, of the first fixing board, facing the second fixing board, and the second circuit board is arranged on one side, of the second fixing board, facing the first fixing board; the first light-emitting columns and the second light-emitting columns are arranged between the first circuit board and the second circuit board, the backlight driving circuit comprises a power supply module and a current adjustment module, the power supply module is arranged on the first circuit board, and the current adjustment module is arranged on the second circuit board; the power supply module is configured to provide power signals to a plurality of first light-emitting columns connected in parallel and a plurality of second light-emitting columns connected in parallel, wherein the backlight driving circuit further comprises a plurality of first connecting wires and a plurality of second connecting wires; wherein the power supply module is electrically connected with first ends of the first light-emitting columns and first ends of the second light-emitting columns; the current adjustment module is electrically connected with second ends of the first light-emitting columns and second ends of the second light-emitting columns simultaneously, and the current adjustment module is electrically connected to the power supply module selectively through the plurality of first connecting wires or the plurality of second connecting wires; the current adjustment module is used to detect brightness of the first light-emitting columns and/or brightness of the second light-emitting columns to obtain a detection current, and compare the detection current with a mode switching current;

when the detection current is less than the mode switching current, the current adjustment module controls the second end of one of the first light-emitting columns and the second end of one of the second light-emitting columns electrically connect with one of the first connecting wires simultaneously; when the detection current is greater than or equal to the mode switching current, the current adjustment module controls the second end of one of the first light-emitting columns to connect with one of the second connecting wires, and controls the second end of one of the second light-emitting columns to electrically connect with another of the second connecting wires.

15. The display device according to claim 14, wherein the current adjustment module comprises a brightness detection unit, a comparison unit, a switch control unit, and a switch unit, an output port of the brightness detection unit is electrically connected to the comparison unit, the comparison unit is electrically connected to the switch control unit, the switch control unit is further electrically connected to the switch unit;

the brightness detection unit is configured to detect the brightness of the first light-emitting columns and/or the second light-emitting columns, and generate the detection current based on the brightness detected, the output port of the brightness detection unit outputs the detection current to the comparison unit; the comparison unit is configured to sample the detection current to obtain a sampling current and compare the sampling current with a preset reference current;

when the sampling current is less than the preset reference current, the comparison unit outputs a first feedback signal to the switch control unit, and the switch control unit controls the switch unit to electrically connect the second end of one of the first light-emitting columns and the second end of one of the second light-emitting columns with one of the first connecting wires simultaneously according to the first feedback signal;

when the sampling current is greater than or equal to the preset reference current, the comparison unit outputs a second feedback signal to the switch control unit, and the switch control unit controls the switch unit to electrically connect the second end of one first light-emitting column with one second connecting wire, and to electrically connect the second end of one second light-emitting column with another second connecting wire, according to the second feedback signal.

16. The display device according to claim 15, wherein the comparison unit comprises a comparator, the comparator comprises a non-inverting input port, an inverting input port, and a comparison output port, the non-inverting input port is electrically connected with the output port of the brightness detection unit, the inverting input port receives the preset reference current, the comparison output port is electrically connected with the switch control unit, the comparator receives the sampling current through the non-inverting input port;

when the sampling current is less than the preset reference current, the comparison output port outputs the first feedback signal to the switch control unit, to cause the switch control unit to control the switch unit to electrically connect the second end of one of the first light-emitting columns and the second end of one of the second light-emitting columns with one of the first connecting wires simultaneously according to the first feedback signal;

when the sampling current is greater than or equal to the preset reference current, the comparison output port outputs the second feedback signal to the switch control unit, to cause the switch control unit to control the switch unit to electrically connect the second end of one first light-emitting column with one second connecting wire, and to electrically connect the second end of one second light-emitting column with another second connecting wire, according to the second feedback signal.

17. The display device according to claim 16, wherein the comparison unit further comprises a first sampling resistor and a second sampling resistor, the first sampling resistor and the second sampling resistor are connected in series between the output port of the brightness detection unit and a grounded terminal, and the non-inverting input is electrically connected between the first sampling resistor and the second sampling resistor, the first sampling resistor and the second sampling resistor sample a current at the output port of the brightness detection unit to obtain the sampling current.

18. The display device according to claim 15, wherein the switching unit comprises a plurality of first transistors, a plurality of second transistors, a plurality of third transistors and a plurality of fourth transistors, the switching control unit comprises a first signal output terminal and a second signal output terminal;
- a gate of the first transistor is electrically connected with the first signal output terminal of the switch control unit, a source of the first transistor 271 is electrically connected with the second end of one first light-emitting column, and a drain of the first transistor is electrically connected with one second connecting wire;
- a gate of the second transistor is electrically connected with the second signal output terminal of the switch control unit, a source of the second transistor is electrically connected with the second end of the first light-emitting column, a drain of the second transistor is electrically connected with one first connecting wire;
- a gate of the third transistor is electrically connected with the gate of the first transistor and the first signal output terminal of the switch control unit, a source of the third transistor is electrically connected with the second end of one second light-emitting column, a drain of the third transistor is electrically connected with one second connecting wire;
- a gate of the fourth transistor is electrically connected with the gate of the second transistor and the second signal output terminal of the switch control unit, a source of the fourth transistor is electrically connected to the second end of the second light-emitting column, a drain of the fourth transistor is connected to the drain of the second transistor and is further connected with the first connecting wire.

19. The display device according to claim 18, wherein when the switch control unit receives the first feedback signal, the switch control unit outputs a first control signal via the first signal output terminal and outputs a second control signal via the second signal output terminal according to the first feedback signal, the first control signal controls the first transistor and the third transistor to turn off, the second control signal controls the second transistor and the fourth transistor to turn on;
when the switch control unit receives the second feedback signal, the switch control unit outputs the second control signal via the first signal output terminal and outputs the first control signal via the second signal output terminal according to the second feedback signal, the first control signal controls the second transistor and the fourth transistor to turn off, the second control signal controls the first transistor and the third transistor to turn on.

\* \* \* \* \*